US011385371B2

(12) United States Patent
Udengaard

(10) Patent No.: US 11,385,371 B2
(45) Date of Patent: *Jul. 12, 2022

(54) SYSTEMS AND METHODS OF DETERMINING PARAMETERS OF A MARINE SEISMIC SURVEY

(71) Applicant: Magseis FF LLC, Houston, TX (US)

(72) Inventor: Carsten Udengaard, Sugar Land, TX (US)

(73) Assignee: Magseis FF LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/018,849

(22) Filed: Sep. 11, 2020

(65) Prior Publication Data

US 2020/0408942 A1 Dec. 31, 2020

Related U.S. Application Data

(63) Continuation of application No. 16/790,272, filed on Feb. 13, 2020, now Pat. No. 10,802,169, which is a
(Continued)

(51) Int. Cl.
*G01V 1/28* (2006.01)
*G01V 1/36* (2006.01)
*G01V 3/18* (2006.01)
*G06K 9/60* (2006.01)
(Continued)

(52) U.S. Cl.
CPC .............. *G01V 1/303* (2013.01); *G01V 1/282* (2013.01); *G01V 1/3835* (2013.01);
(Continued)

(58) Field of Classification Search
CPC .......... G01V 1/36; G01V 1/3817; G01V 1/38; G01V 2200/12; G01V 2200/14; G01V 1/3835
See application file for complete search history.

(56) References Cited

U.S. PATENT DOCUMENTS

2004/0145968 A1 7/2004 Brittan et al.
2007/0032954 A1* 2/2007 Moore .................... G01V 1/36
702/5
(Continued)

FOREIGN PATENT DOCUMENTS

CN 1497266 5/2004
CN 1633610 6/2005
(Continued)

OTHER PUBLICATIONS

Clarke et al., "Processing of a novel deepwater, wide-azimuth node seismic survey", The Leading Edge, Society of Exploration Geophysicists, Apr. 1, 2007, pp. 504-509 (6 pages).
(Continued)

*Primary Examiner* — Brian Turner
(74) *Attorney, Agent, or Firm* — Sage Patent Group

(57) ABSTRACT

Systems and methods of detecting marine seismic survey parameters are provided. A data processing system can obtain seismic data from seismic data acquisition units disposed on a seabed responsive to an acoustic signal propagated from an acoustic source through a water column. The data processing system can determine from the seismic data, a direct arrival time for the acoustic signal at each of the plurality of seismic data acquisition units, and can obtain an estimated depth value of each of the plurality of seismic data acquisition units and an estimated water column transit velocity of the acoustic signal. The data processing system can apply a depth model and a water column transit velocity model to the estimated depth value and to the estimated water column transit velocity determine an updated depth value and an updated water column transit velocity for each of the plurality of seismic data acquisition units.

20 Claims, 4 Drawing Sheets

Related U.S. Application Data continuation of application No. 16/375,714, filed on Apr. 4, 2019, now Pat. No. 10,598,805, which is a continuation of application No. 14/864,345, filed on Sep. 24, 2015, now Pat. No. 10,274,624.

(51) Int. Cl.
  *G01V 3/06* (2006.01)
  *G01V 1/30* (2006.01)
  *G01V 1/38* (2006.01)

(52) U.S. Cl.
  CPC ...... *G01V 1/3852* (2013.01); *G01V 2210/121* (2013.01); *G01V 2210/1293* (2013.01); *G01V 2210/1427* (2013.01); *G01V 2210/6222* (2013.01); *G01V 2210/67* (2013.01); *G01V 2210/74* (2013.01)

(56) References Cited

U.S. PATENT DOCUMENTS

| | | |
|---|---|---|
| 2010/0074053 A1 | 3/2010 | Jaiswal et al. |
| 2010/0185396 A1 | 7/2010 | Docherty |
| 2011/0273958 A1 | 11/2011 | Xia et al. |
| 2012/0057432 A1 | 3/2012 | Hill et al. |
| 2013/0301387 A1 | 11/2013 | Van Groenestijn |
| 2015/0168576 A1 | 6/2015 | Craft et al. |
| 2015/0331124 A1 | 11/2015 | Haacke et al. |
| 2017/0139070 A1 | 5/2017 | Marc et al. |
| 2017/0168177 A1 | 6/2017 | Wang et al. |

FOREIGN PATENT DOCUMENTS

| | | |
|---|---|---|
| WO | WO-95/08782 A1 | 3/1995 |
| WO | WO-2013/184724 A1 | 12/2013 |
| WO | WO-2015/063595 | 5/2015 |

OTHER PUBLICATIONS

Corrected Notice of Allowability for U.S. Appl. No. 16/375,714 dated Feb. 19, 2020 (5 pages).
Extended European Search Report for PCT/US2016052659 dated Apr. 29, 2019 (9 pages).
Final Office Action for U.S. Appl. No. 14/864,345 dated May 11, 2018 (14 pages).
First Office Action for CN 20160067358.3 dated Apr. 2, 2019 (16 pages).
International Preliminary Report on Patentability, Ch.I, for PCT/US2016/052659 dated Apr. 5, 2018 (9 pages).
International Search Report and Written Opinion of the International Searching Authority for PCT/US2016/052659 dated Nov. 18, 2017 (10 pages).
Non-Final Office Action for U.S. Appl. No. 14/864,345 dated Sep. 20, 2017 (21 pages).
Non-Final Office Action for U.S. Appl. No. 14/864,345 dated Sep. 20, 2018 (14 pages).
Non-Final Office Action for U.S. Appl. No. 16/790,272 dated Apr. 16, 2020 (10 pages).
Notice of Allowance for U.S. Appl. No. 14/864,345 dated Mar. 4, 2019 (8 pages).
Notice of Allowance for U.S. Appl. No. 16/375,714 dated Nov. 14, 2019 (9 pages).
Notice of Allowance for U.S. Appl. No. 16/375,714 dated Dec. 30, 2019 (6 pages).
Notice of Allowance for U.S. Appl. No. 16/790,272 dated Jun. 12, 2020 (9 pages).
Office Action for BR 112018005272-8 dated May 20, 2020 (4 pages).
Office Action for ID PID201801984 dated Jul. 22, 2020 (6 pages).
Examination Report for MX/a/2018/003383 dated May 12, 2021 (6 pages).

\* cited by examiner

SYSTEMS AND METHODS OF DETERMINING PARAMETERS OF A MARINE SEISMIC SURVEY

CROSS-REFERENCE TO RELATED APPLICATIONS

This application claims the benefit of priority under 35 U.S.C. § 120 as a continuation of U.S. patent application Ser. No. 16/790,272, filed Feb. 13, 2020, which is a continuation of U.S. patent application Ser. No. 16/375,714, filed Apr. 4, 2019, which is a continuation of U.S. patent application Ser. No. 14/864,345, filed Sep. 24, 2015, each of which is hereby incorporated by reference herein in its entirety.

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY

At least one aspect is directed to a method of detecting seismic data acquisition unit depth and acoustic signal water column transit velocity for a seismic survey. The method can include obtaining, by a data processing system, seismic data acquired by a plurality of seismic data acquisition units disposed on a seabed responsive to an acoustic signal propagated from an acoustic source through a water column. The method can include determining, by the data processing system, from the seismic data, a direct arrival time for the acoustic signal at each of the plurality of seismic data acquisition units. The method can include obtaining an estimated depth value of each of the plurality of seismic data acquisition units and an estimated water column transit velocity of the acoustic signal. The method can include identifying an average travel time error value based on the direct arrival time for the acoustic signal at each of the plurality of seismic data acquisition units, the estimated depth value, and the estimated water column transit velocity. The method can include determining an initial mean absolute deviation of travel time error from the average travel time error value. The method can include applying a depth model and a water column transit velocity model to the estimated depth value and to the estimated water column transit velocity to determine, using the initial mean absolute deviation of travel time error, an updated depth value and an updated water column transit velocity for each of the plurality of seismic data acquisition units. The method can include creating, by the data processing system, a data structure indicating the updated depth value for each of the plurality of seismic data acquisition units.

At least one aspect is directed to a system of detecting parameters related to a marine seismic survey. The system can include a data processing system having a depth value generation module and a water column transit velocity generation module. The data processing system can obtain seismic data acquired by a plurality of seismic data acquisition units disposed on a seabed responsive to an acoustic signal propagated from an acoustic source through a water column. The data processing system can determine, from the seismic data, a direct arrival time for the acoustic signal at each of the plurality of seismic data acquisition units. The data processing system can obtain an estimated depth value of each of the plurality of seismic data acquisition units and an estimated water column transit velocity of the acoustic signal. The data processing system can identify an average travel time error value based on the direct arrival time for the acoustic signal at each of the plurality of seismic data acquisition units, the estimated depth value, and the estimated water column transit velocity. The data processing system can determine an initial mean absolute deviation of travel time error from the average travel time error value. The data processing system can apply a depth model and a water column transit velocity model to the estimated depth value and to the estimated water column transit velocity determine an updated depth value and an updated water column transit velocity for each of the plurality of seismic data acquisition units. The data processing system can create a data structure indicating the updated depth value for each of the plurality of seismic data acquisition units.

At least one aspect is directed to a computer readable storage medium storing instructions that when executed by one or more data processors, cause the one or more data processors to perform operations. The operations can include obtaining seismic data acquired by a plurality of seismic data acquisition units disposed on a seabed responsive to an acoustic signal propagated from an acoustic source through a water column as part of a seismic survey. The operations can include determining, from the seismic data, a direct arrival time for the acoustic signal at each of the plurality of seismic data acquisition units, and obtaining an estimated depth value of each of the plurality of seismic data acquisition units and an estimated water column transit velocity of the acoustic signal. The operations can include identifying an average travel time error value based on the direct arrival time for the acoustic signal at each of the plurality of seismic data acquisition units, the estimated depth value, and the estimated water column transit velocity. The operations can include determining an initial mean absolute deviation of travel time error from the average travel time error value. The operations can include determining an updated depth value and an updated water column transit velocity for each of the plurality of seismic data acquisition units. The operations can include creating a data structure indicating the updated depth value for each of the plurality of seismic data acquisition units.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of determining or estimating the depth of one or more receivers such as seismic data acquisition units associated with a seismic survey, as well as determining or estimating water column transit velocity of an acoustic or other signal that propagates to or from a seismic source through a water column. The various concepts introduced above and discussed in greater detail below may be implemented in any of numerous ways.

Systems and method of the present disclosure relate generally to determining or detecting parameters such as seismic data acquisition unit depth or acoustic signal water column transit velocity related to a marine seismic survey. The data processing system described herein can determine seismic data acquisition unit depth for a plurality of seismic data acquisition units, and can determine the water column transit velocity of one or more acoustic signals from (or sometimes exclusively from) seismic data that can include timing information. By applying depth and water column transit velocity models to the seismic data, the data processing system can determine seismic data acquisition unit depth and acoustic signal water column transit velocity from or simultaneously from the seismic data, in the presence of timing errors for any given seismic data acquisition unit, and without zero mean error assumptions on a starting model for receiver depth or water velocity that could for example be present with traveltime inversion techniques. For example, unit depth errors using traveltime inversion techniques may not be zero mean error based due to depth variances associated with an uneven seabed 135 in an area of a seismic survey.

Figure 1:
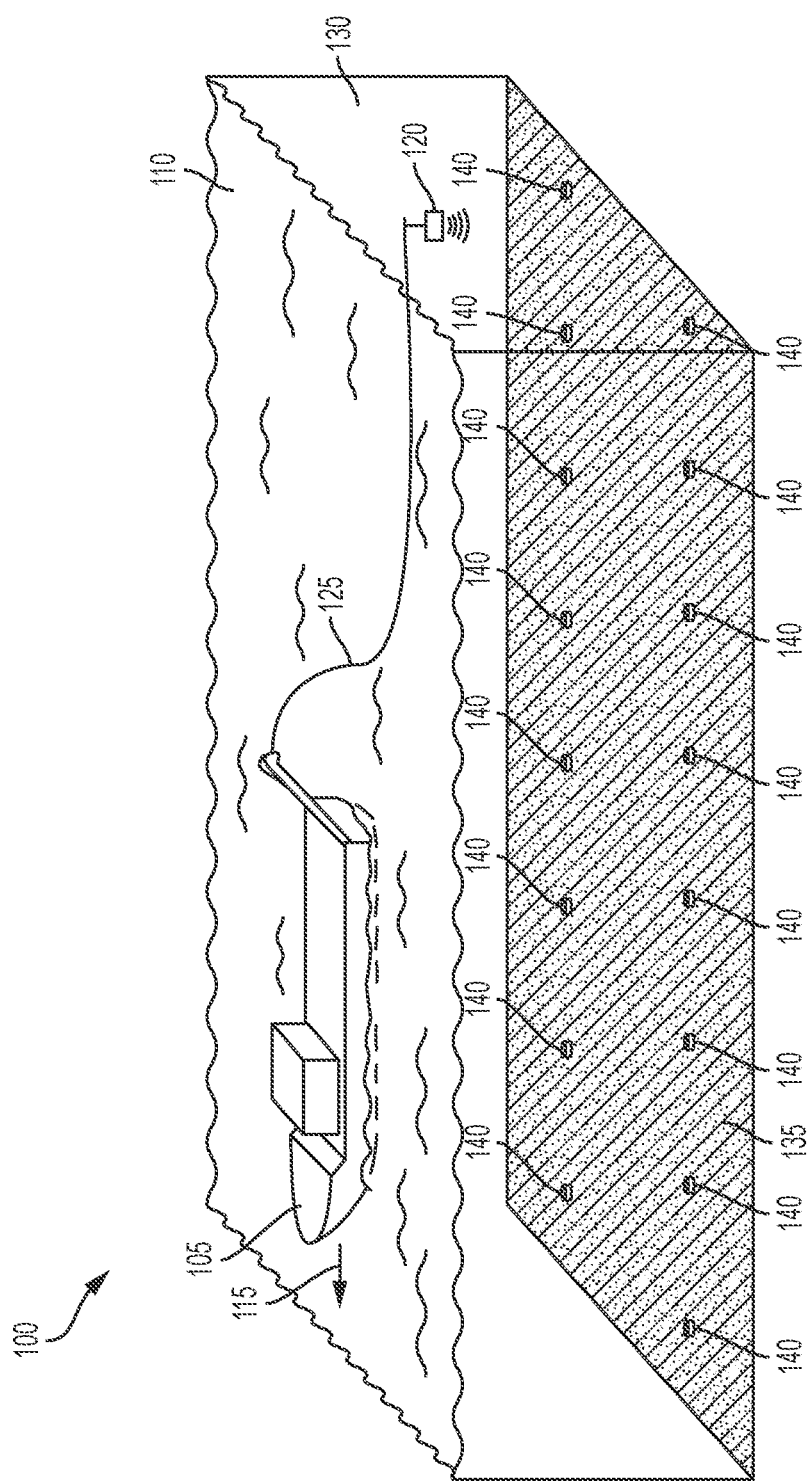
FIG. 1 is a schematic diagram depicting an example system for detecting parameters related to marine seismic survey, according to an illustrative implementation.

FIG. 1 depicts a system 100 for detecting parameters related to a marine seismic survey. The system 100 can include at least one vessel 105, such as a ship that implements a marine seismic survey. The vessel 105 can travel through a body of water 110, in direction of motion 115, for example. The body of water 110 can include fresh water, salt water, mixed water, volumes of oceans, seas, or lakes, or mixed or transition zones such as inlets, deltas, or bays. The vessel 105 can include, be equipped with, or tow at least one seismic source 120 through the body of water 110.

The seismic sources 120 can include at least one air gun or other device that generates seismic energy. The seismic source(s) 120 can be towed behind or positioned underneath the vessel 105, and disposed under the surface of the body of water 110. For example, at least one cable 125 can tow the seismic source 120 behind the vessel at a depth of between 2 and 80 meters below the surface of the body of water 110. In one implementation the seismic source depth is 10 meters below the surface of the both of water 110. The seismic source 120 can actuate to produce at least one pulse of acoustic energy (e.g. at least one acoustic signal) that propagates from the seismic source 120 through the water column 130, where it passes through the seabed 135 and penetrates beneath the surface of the earth. The acoustic energy can reflect or refract off of subsurface features, such as geologic boundaries or layers. The reflected or refracted signals can be detected or recorded as seismic data by at least one seismic data acquisition unit 140 disposed on the seabed 135. In some implementations, a plurality of seismic sources 120 are disposed in an array of individual air guns of varying sizes, disposed at the same or varying depths, that can be simultaneously actuated to generate the acoustic signal or sequentially actuated to generate multiple acoustic signals. Further, multiple cables 125 can attach multiple seismic sources 120 to the vessel 105. For example, the vessel 105 can tow multiple cables 125 in parallel with seismic sources 120 arranged in a parallel line or grid configuration and attached to the cables 125.

The system 100 can include a plurality of seismic data acquisition units 140. The seismic data acquisition units 140 can each include at least one geophone or hydrophone to detect the seismic data. The seismic data acquisition units 140 can each include at least one power source, memory, hydrophone, geophone, and communication interface to transmit the seismic data out from the seismic data acquisition unit 140. The seismic data acquisition units 140 can be deployed from the vessel 105 that is associated with the seismic source, or from a different vessel to the seabed 135. One or more remote operating vehicle (ROV) can assist with deployment and collection of the seismic data acquisition units 140. For example, the ROV can be a submersible autonomous vehicle that can place or collect the seismic data acquisition units 140 on or from the seabed 135. The seismic data acquisition units 140 can be disposed in an array such as a grid pattern (e.g., a symmetric formation) on the seabed 135. Each seismic data acquisition unit 140 can collect and store seismic data. Upon retrieval, for example by an ROV or via a cable, the seismic data can be extracted or obtained from the seismic data acquisition units 140. For example the seismic data can be transmitted or manually extracted from the seismic data acquisition units 140. The seismic data can be interpreted to identify geologic boundaries or formations that may indicate the presence of minerals, hydrocarbons, or various earth elements. In addition to ROV or manual seismic data extraction, the seismic data acquisition units 140 can also transmit the acquired seismic data to a database or data processing system via wired communication using at least one data communications cable connected to the seismic data acquisition unit, or via wireless communication such as laser or optic based subsurface communications through the water column 130 between seismic data acquisition units 140 and additional relay, computing, or data storage devices.

Figure 2:
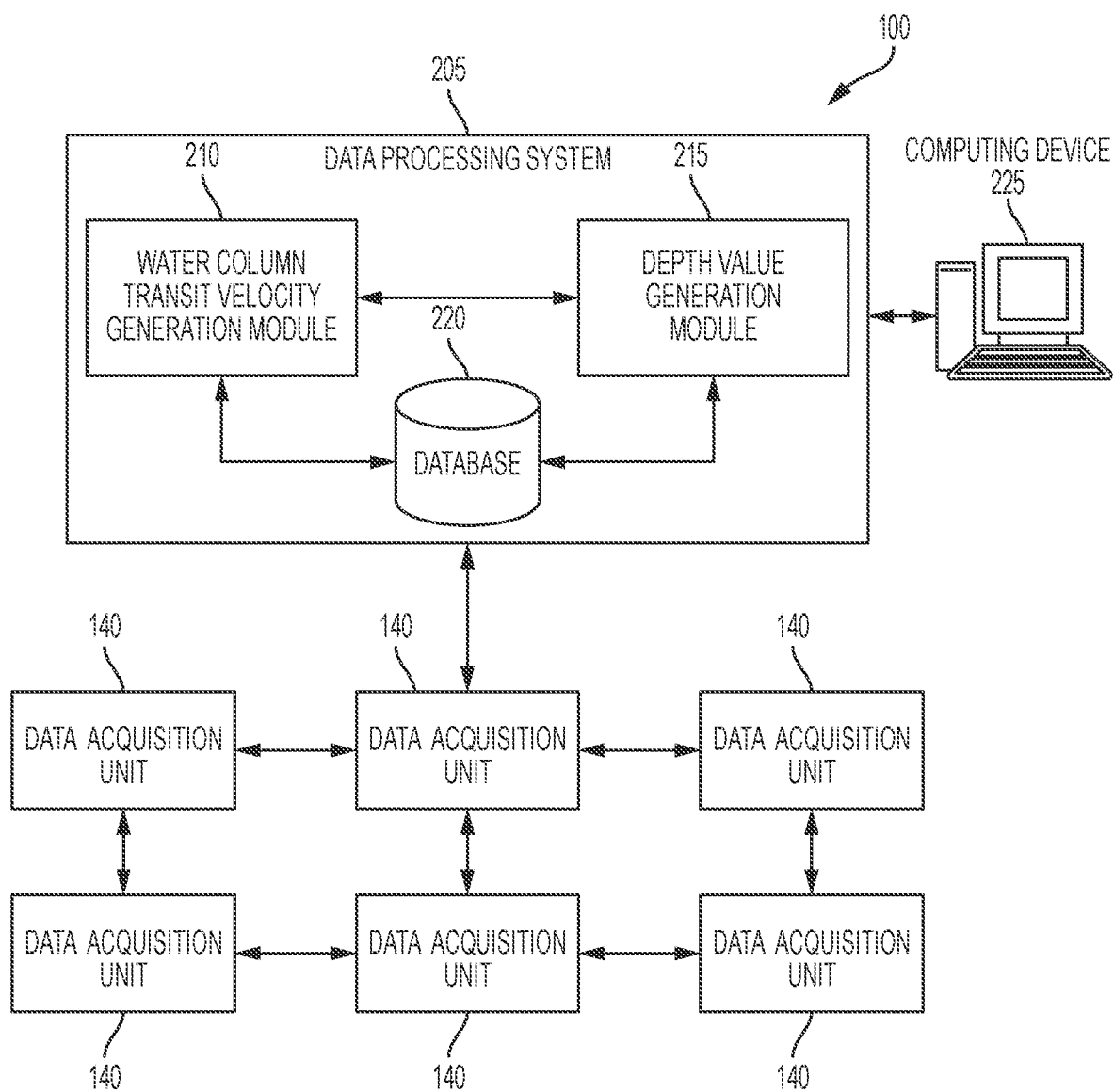
FIG. 2 is a block diagram depicting an example environment for detecting parameters related to marine seismic survey, according to an illustrative implementation.

Referring to FIG. 2, among others, the system 100 can include at least one data processing system 205, such as at least one logic device such as a computing device, server, personal computer, laptop, desktop, tablet, mobile, personal digital assistant, or smartphone computing device having at least one processor. The data processing system 205 can be located on the vessel 105, or separate from the vessel 105 in a land based facility. The data processing system 205 can include at least one server. For example, the data processing system 205 can include a plurality of servers located in at least one data center or server farm. The data processing system 205 can estimate or otherwise determine seismic data acquisition unit depth and acoustic signal water column transit velocity from the seismic data. In some implementations, the data processing system 205 estimates or determines the seismic data acquisition unit depth and acoustic signal water column transit velocity exclusively from the seismic data, which includes timing information related to the acoustic signal.

The data processing system 205 can include at least one water column transit velocity generation module 210, at least one depth value generation module 215, and at least one database 220. The water column transit velocity generation module 210 and the depth value generation module 215 can each include at least one processing unit, server, virtual server, circuit, engine, agent, appliance, or other logic device such as programmable logic arrays configured to communicate with the database 220 and with other computing devices 225 (e.g., other laptop, personal, desktop, tablet, or smartphone computing devices via a computer network). The database 220 can store the seismic data obtained from the seismic data acquisition units 140 as well as data generated by the water column transit velocity generation module 210 and the depth value generation module 215, for example.

The water column transit velocity generation module 210 and the depth value generation module 215 can include or execute at least one computer program or at least one script. The water column transit velocity generation module 210 and the depth value generation module 215 can be separate components, a single component, or part of the data processing system 205. The water column transit velocity generation module 210 and the depth value generation module 215 can include combinations of software and hardware, such as one or more processors configured to obtain and evaluate seismic data from the seismic data acquisition units 140, determine direct arrival times for the acoustic signal at one or more of the seismic data acquisition units 140, obtain estimated depth values of one or more of the seismic data acquisition units 140, obtain estimated water column transit velocities of one or more of the seismic data acquisition units 140, identify average travel time error values of the seismic data and initial mean absolute deviation values of the average travel time error values, apply depth models and water column transit velocity models to the estimated depth value and the estimated water column transit velocity to determine updated depth values and updated water column velocities, and to create one or more data structures indicating the updated depth values or updated water column velocities, for example.

The data processing system 205 can include servers or end user computing devices configured to display data (directly at a monitor or indirectly by communicating via a computer network to another computing device such as the computing device 225) such as the updated depth value of one or more seismic data acquisition units 140 or the updated water column transit velocity of the acoustic signal, as well as other data such as interpretations of the seismic data indicating the presence or absence of geologic boundaries, layers, formations, mineral or hydrocarbon deposits, or other conditions such as salt domes. The data processing system 205 can include desktop computers, laptop computers, tablet computers, smartphones, personal digital assistants, mobile devices, end user computing devices, consumer computing devices, servers, clients, and other computing devices. The data processing system 205 can include user interfaces such as microphones, speakers, touchscreens, keyboards, pointing devices, a computer mouse, touchpad, or other input or output interfaces.

The data processing system 205 can include the water column transit velocity generation module 210 or the depth value generation module 215 as part of one or more servers of a seismic data interpretation system to receive seismic data from the seismic data acquisition units 140 directly, manually (via a memory stick, disk, or removable media transferred from the seismic data acquisition units 140 to the data processing system 205) or via a wired or wireless network such as the internet or local, wide, or metro area network, and to provide output data such as updated depth values that indicate the subsurface depth of the seismic data acquisition units 140 when disposed on the seabed 135, as well as updated water column transit velocity values that indicate a velocity of one or more acoustic signals through the water column 130 from the seismic source 120 to the seismic data acquisition units 140 or vice-versa.

The water column transit velocity generation module 210 or the depth value generation module 215 can be part of, or can include scripts executed by, one or more servers in the data processing system 205 (e.g., a search engine system) to determine depth values and water column transit velocity values. The water column transit velocity generation module 210 can be part of the same computing device or a different computing device as the depth value generation module 215 in the data processing system 205. From the seismic data, the water column transit velocity generation module 210 can determine water column transit velocity values, and can refine or update those values. Also from the seismic data, the depth value generation module 215 can determine depth values of the seismic data acquisition units 140, and can update those values.

The data processing system 205 can include multiple servers or other computing devices (laptop, desktop, mobile, tablet, or smartphone computing device) in communication with each other via a network. The network can include computer networks such as the internet, local, wide, metro or other area networks, intranets, satellite networks, other computer networks such as voice or data mobile phone communication networks, and combinations thereof.

In some implementations, the data processing system 205 can obtain the seismic data. For example, the vessel 105 can tow at least one seismic source 120. The seismic source 120 can be actuated to generate at least one acoustic signal that propagates through the water column 130. At least some of the acoustic signal can pass through the seabed 135, down into the earth, and reflect or refract off of subsurface geologic formations, back (e.g., up) toward the surface of seabed 135 (e.g., the ocean floor). The seismic data acquisition units 140 can detect, collect, acquire, or record this reflected or refracted seismic data. The seismic data can then be transferred (e.g., via wired, wireless, manual, optical, or direct transmissions) from the seismic data acquisition units 140 to the data processing system 205. The data processing system 205 can obtain the seismic data while present on the vessel 105 (e.g., as a computing device disposed in a control station of the vessel 105) or at a land based location. Thus, the data processing system 205 can obtain the seismic data that was first acquired by the seismic data acquisition units 140 responsive to propagation of the acoustic signal from the acoustic source through the water column. The seismic data can include timing data related to actuation of the seismic source 120 or related to time of acquisition of the seismic data by the seismic data acquisition units 140.

From the seismic data, the data processing system 205 can determine a direct arrival time for the acoustic signal at each or at least one of the seismic data acquisition units 140. The direct arrival time indicates a time period from generation of the acoustic signal to detection of the seismic data by a seismic data acquisition unit 140. The data processing system 205 can determine the direct arrival time using a first break picking detection technique. For example, the data processing system 205 can determine the direct arrival time by determining the time of maximum amplitude of the seismic wavelet after applying a source designature. The seismic data analyzed by the data processing system 205 to determine the direct arrival time can be a raw wavelet that is unprocessed or unchanged from the seismic data as acquired by the seismic data acquisition unit 140, or can be filtered to remove minimum phase or zero phase occurrences.

The data processing system 205 (or component thereof such as the depth value generation module 215) can determine an estimated depth value of each of the plurality of seismic data acquisition units 140. For example, the estimated depth value can be an initial estimated depth of a seismic data acquisition unit 140 disposed on the seabed 135 at the bottom of the water column 130. The data processing system 205 can update this initial estimated depth value to determine a more precise updated depth value as described herein. In some implementations, a remote operated vehicle (ROV) or autonomous underwater vehicle (AUV), (e.g., an unmanned submarine) equipped with a pressure sensor or other depth sensor can pass generally near (e.g., within 50 meters) seismic data acquisition units 140 and based on water pressure or other measurement can determine a depth. The data processing system 205 can obtain this information (or determine the estimated depth from pressure or other information received from the ROV or AUV or from the seismic data acquisition units 140 themselves) and can assign depth values to each seismic data acquisition unit 140. The data processing system 205 can also determine the estimated depth values for each of the seismic data acquisition units 140 from data obtained via echo sounding, sonar, or fathometer techniques that are implemented from the vessel 105, or from preexisting data, e.g., obtained from the database 220. The estimated depth value of the seismic data acquisition units 140 can be within 100 meters of the actual depth of the seismic data acquisition units 140. In some implementations, the estimated depth value is within 50 meters of the actual depth value of the seismic data acquisition units.

The water column transit velocity generation module 210 or other component of the data processing system 205 can obtain at least one estimated water column transit velocity of the acoustic signal. The estimated water column transit velocity can be an initial estimated transit velocity of the acoustic signal through the water column 130. The estimated water column transit velocity can be a predetermined (e.g., rather than measured) velocity. For example, the estimated water column transit velocity can be a predetermined time constant and depth invariant water velocity of 1500 meters/second, although other values above and below this value can be used. The data processing system 205 can update this initial estimated water column transit velocity to determine a more precise updated water column transit velocity as described herein.

The data processing system 205 can identify or determine an average travel time error value for the acoustic signal(s) at each of the plurality of seismic data acquisition units 140, based on the direct arrival time of the acoustic signal at each of the plurality of seismic data acquisition units 140 and based on the estimated depth values and estimated water column transit velocity of the acoustic signal(s).

Travel time error can be the difference between a modeled travel time and the actual picked travel time, or direct arrival time, represented for example by the following equation:

$$T_{error}(s, r, t) = \frac{\sqrt{(s_x - r_x)^2 + (s_y - r_y)^2 + (s_z - r_z)^2}}{v(t, r_z)} - DA(s, r)$$

In this equation s is a unique source, r is a unique receiver. The coordinates $s_x$, $s_y$, and $s_z$ are the modeled source X Y and Z coordinates. The coordinates $r_x$, $r_y$, and $r_z$ are the modeled receiver X Y and Z coordinates, in the case of this process $r_z$ is variable. The variable $v(t, r_z)$ is the time and depth variable velocity function at the time of the acoustic signal (e.g., shot) and depth of the receiver. DA(s,r) is the picked direct arrival time for the unique source receiver pair.

For example, the data processing system 205 can determine the travel time error for individual seismic data acquisition units 140 that indicates a time difference between the determined direct arrival time for a given seismic data acquisition unit 140 (determined from the seismic data) and a model arrival time based on the estimated depth value and the estimated water column transit velocity for that given seismic data acquisition unit 140. The data processing system 205 can average the travel time error values of each seismic data acquisition unit 140 to identify or determine the average travel time error value for a seismic survey or portion thereof such as one or more acoustic signals propagated from at least one seismic source 120.

From the average travel time error value, the data processing system 205 can determine an initial mean absolute deviation of travel time error. The initial mean absolute deviation can be determined from the travel time error of the initial model of a given vessel pass, using the initially defined velocity and receiver depth. The mean absolute deviation can be the average of the absolute value of the difference between the travel time errors and the average travel time error, represented for example by the following equations, where $T_{error}(s,r,t)$ is the travel time error for a given trace (unique source receiver pair), and n is the number of traces in the grouping of traces analyzed:

$$Error_{mean} = \frac{\sum T_{error}(s, r, t)}{n}$$

$$MeanAbsoluteDeviation = \frac{\sum |T_{error}(s, r, t) - Error_{mean}|}{n}$$

This can be applied to a sail line, source pass, or any other collection of source locations that are reasonably close in spatial location and time of acquisition, within the offset range selected for analysis. In some implementations, the initial mean absolute deviation is determined, rather than standard deviation, as the travel time error values may not have a standard distribution. The data processing system 205 can update this initial mean absolute deviation of travel time error to determine a more precise mean absolute deviation of travel time error value.

Thus, the data processing system 205 can determine or obtain the (initial) estimated depth value and (initial) estimated water column transit velocity associated with each seismic data acquisition unit 140, as well as an initial absolute deviation of travel time error. With the estimated depth value, the estimated water column transit velocity, and the initial mean absolute deviation of travel time error, the date processing system 205 can determine an updated depth value and an updated water column transit velocity for each of the acoustic signal/seismic data acquisition unit 140 pairs. The updated receiver depth and water column transit velocity can be selected from a predetermined grid of variances of the initial modelled values. The grid can have regular variations, random variations, or pseudo random variations. For example, the updated depth value and water column transit velocity can selected from the pair that results in the lowest mean absolute deviation of error of all pairs iterated.

For example, the data processing system 205 or components such as the depth value generation module 215 and the water column transit velocity module 210 can apply a depth model and a water column transit velocity transit model to the estimated depth value and to the estimated water column transit velocity model, respectively, to determine, using the initial mean absolute deviation of travel time error, an updated depth value for all or at least one of the seismic data acquisition units 140 and an updated water column transit velocity of at least one acoustic signal to or from at least one of the seismic data acquisition units 140.

The process of updating the estimated depth value and the estimated water column transit velocity for associated with the seismic source(s) 120 and seismic data acquisition units 140 can include iterative calculations of depth values and water column velocities for the seismic source 120 (or for the acoustic signals emanating from those sources) and the seismic data acquisition units 140. For example, the estimated depth value can be adjusted by a predetermined amount such as 1.5 meters, and the estimated water column transit velocity of the acoustic signal can be adjusted by a predetermined velocity such as 0.5 meters/second. These values are examples and other values above and below these values can be used. With these adjusted values, the data processing system 205 can determine new or updated depth values and water column transit velocity. For example, an average travel time error value that indicates an average of the differences between the direct arrival time (from the obtained seismic data) and the modeled arrival time based on the values adjusted by 1.5 m and 0.5 m/s can be determined for a series of acoustic signals (e.g., from a source pass of the seismic source 120) and each seismic data acquisition unit 140. The data processing system 205 can determine a new mean absolute deviation from this (new) average travel time error value for the given depth/velocity pair adjusted by 1.5 m and 0.5 m/s. The data processing system 205 can compare the new mean absolute deviation of travel time error (that is based on the adjusted values) with the initial mean absolute deviation (based on the original values). When the new mean absolute deviation of travel time error is less than (and therefore better than) the initial (or other previous) mean absolute deviation the data processing system 205 can update the water column transit velocity with the new value (e.g., adjusted by 0.5 m/s), or can update the estimated depth value of a seismic data acquisition unit 140 with the new value (e.g., adjusted by 1.5 m). This example results in a refinement of the originally estimated depth and water column transit velocity values.

The updated values can be referred to as the best values at this stage in the iterative process. This process can repeat in an iterative manner. For example, the data processing system 205 can adjust the depth value of a seismic data acquisition unit 140 by another 1.5 m, and the water column transit velocity by another 0.5 m/s. From this data another (newer) mean absolute deviation of travel time error can be determined and compared with the previous or best mean absolute deviation of travel time error. If the newer mean absolute deviation of travel time error is less than the previous or best absolute deviation of travel time error, the data processing system 205 can again update the water column transit velocity or can again update the estimated depth value. If the newer mean absolute deviation of travel time error is greater than or equal to the previous or best absolute deviation of travel time error, the data processing system 205 can discard the newer mean absolute deviation of travel time error (or associated depth value or water column transmit velocity) and continue to use the previous best values. The data processing system 205 can execute any number of these iterations. For example, the data processing system 205 can run 41 iterations where the estimated water column transit velocity or estimated depth value are adjusted 41 times at predetermined step values of 1.5 m for the estimated depth values of 0.5 m/s for the estimated water column transit velocity.

In some implementations, having determined the initial mean absolute deviation of travel time error, the data processing system 205 applies a depth model (e.g., using the depth value generation module 215) and applies a water column transit velocity generation model (e.g., using the water column transit velocity generation module 210) to implement one or more of the following operations to update the estimated depth value and the estimated water column transit velocity model:

1.) Identify the step size or adjustment value from the (e.g., initial) estimated values of the depth value (e.g., 1.5 m) and of the water column transit velocity (e.g., 0.5 m/s) and a number of iterations (e.g., 41 iterations at these step sizes for both the depth value and the water column transit velocity). These may be referred to as the model values.

2.) Determine the travel time error value between the direct arrival time determined from the seismic data and the direct arrival time determined from the adjusted values.

3.) Determine the average travel time error with the adjusted (or updated) depth value and water column transit velocity for a source pass or series of acoustic signals for each seismic data acquisition unit 140.

4.) Determine the (updated) mean absolute deviation from the average travel time error value for each adjusted depth value/water column transit velocity pair using the adjusted values.

5.) Compare the updated mean absolute deviation from the average travel time error value with the initial mean absolute deviation of travel time error from the average travel time error value. When the updated mean absolute deviation is less than the initial mean absolute deviation (or less than a previous best mean absolute deviation value), the data processing system 205 assigns or classifies the adjusted depth value as the (best available) updated depth value, or the data processing system assigns or classifies the adjusted water column transit velocity as the (best available) updated water column transit velocity for at least one seismic data acquisition unit 140. When the updated mean absolute deviation is greater than or equal to the initial mean absolute deviation (or to a previous best mean absolute deviation value), the data processing system 205 does not modify the initial, estimated, or previously updated best depth value and water column transit velocity for at least one seismic data acquisition unit 140. In this latter example, the data processing system 205 can discard the updated (greater) depth or values associated with the updated mean absolute deviation.

6.) Repeat operations 1-5 for a number of iterations. For example, the data processing system 205 can adjust the depth value and water column transit velocity value at the 1.5 m and 0.5 m/s steps, respectively, 41 times (or any other number) so that, in this example, 41 potential depth values and 41 potential water column transit velocities are evaluated for each acoustic signal and each seismic data acquisition unit 140, which may be referred to as a 41×41 grid.

In the above example, the data processing system 205 has determined an updated depth value and updated water column transit velocity for at least one (or for all) of the seismic data acquisition units 140 using, for example, the coarse adjustment values of 1.5 m for depth values and 0.5 m/s for water column transit velocity. In some implementations, the data processing system 205 refines (or continues updating) these updated values. For example, the data processing system 205 (and components thereof) can repeat operations 1-6 with smaller adjustment values of, for example, 0.15 m depth steps and 0.1 m/s velocity increments again on a 41×41 grid for all or some of the seismic data acquisition units 140. The depth model and the water column transit velocity transit model can be a single model (or module) or separate models, and can include one or mode scripts, applications or code that can be, for example, accessed from the database 220 (or other memory) and executed by the data processing system 205 to determine the updated depth values and updated water column transit velocity for a given source pass, or series of acoustic signals from one pass of the vessel 105 and seismic source 120 over the seismic data acquisition units 140.

The data processing system 205 can determine updated depth values and updated water column transit velocity for the seismic data acquisition units 140 for multiple source passes, or multiple trips of the vessel 105 and seismic source 120 over at least a portion of the seismic data acquisition units 140. In some implementations, the depth value generation module 215 (or other component of the data processing system 205) can determine the average of the final or updated depth values from a series of source passes for each seismic data acquisition unit 140. In this example, the average receiver depth is determined from multiple source 120/vessel 105 passes. For example, there may be depth changes between source passes due to tidal or current changes, or to variations in the depths of the seismic sources 120 beneath the surface of the body of water 110. The water column transit velocity can then be further refined or updated with the depth value fixed at the average depth value. For example, the data processing system 205 can fix the depth value at the average depth value, and starting with the estimated water column transit velocity of 1500 m/s, can repeat the iterative process (e.g., operations 1.-6.) with the fixed average depth value and with 0.1 m/s adjustments to the estimated water column transit velocity from the 1500 m/s starting point or from the best previously determined water column transit velocity. In one implementation, the data processing system 205 repeats this process for 201 iterations, although other values above and below this number are possible.

For example, the data processing system 205 can perform the following operations with the fixed average depth value to further refine the update water column transit velocity (e.g., by applying the depth/water column transit velocity model(s)):

1.) With the fixed average depth value (of at least one seismic data acquisition unit 140) the data processing system 205 can determine the travel time error value between the direct arrival time determined from the seismic data and the direct arrival time determined from the fixed average depth value and the adjusted water column transit velocity (e.g., adjusted by 0.1 m/s increments).

2.) Determine the average travel time error for at least one seismic data acquisition unit 140 for a source pass over the seismic data acquisition unit(s) 140 with the adjusted water column transit velocity.

3.) Determine the (new) mean absolute deviation from the average travel time error for the given adjusted water column transit velocity.

4.) Compare the (new) mean absolute deviation from operation 3 immediately above with the best previously determined mean absolute deviation. When the new mean absolute deviation is less than the best previously determined mean absolute deviation, then replace the best previously determined mean absolute deviation with the new mean absolute deviation. When the new mean absolute deviation is great than or equal to the best previously determined mean absolute deviation, then do not replace the best previously determined mean absolute deviation.

5.) Repeat operations 1-4 immediately above for all grid values (e.g., 201 iterations with 0.1 m/s adjustments to the water column transit velocity).

In the above example, the data processing system 205 can determine that, so far, the best updated water column transit velocity is the one associated with the best mean absolute deviation value.

The data processing system 205 can create one or more data structures indicating the updated depth value or the updated water column transit velocity for all or at least one of the seismic data acquisition units 140. In some implementations, the data structure includes one or more ASCII files that, for example, identify individual seismic data acquisition units 140 and indicate their associated updated depth values or updated water column transit velocity associated with one or more acoustic signals. The data structure can be written to or read from the database 220, and can be provided for display or rendering at one or more computing devices 225, e.g., as a report. The computing devices 225 can be part of the data processing system 205 or separate from the data processing system 205. For example, the data processing system 205 can transmit the data structure as a report to the computing device 225 via the internet or other computer network for display by the computing device 225. The data structures described herein can include other text or character coding schemes, such as UTF-8 coding schemes.

The water column transit velocity of acoustic signals can change based on factors such as time or the depth of the water column 130. In some implementations, the water column transit velocity model includes a two layer model, where the water column transit velocity of the acoustic signal through the deep layer of the water column 130 (e.g., greater than 1250 meters) is determined by the data processing system 205 to be a function of the depth of the water with no time dependent variation. In this example, the shallow layer (e.g., less than 1250 m) is determined by the data processing system 205 to have the majority or all of the time dependent velocity variation. In some implementations, the data processing server 205 determines the water column transit velocity for a deep layer of the water column 130. The deep layer velocity can be determined as a function of water depth, based, for example on the following equation, where $V_{1250}$ is the interval velocity, e.g., 1488.6 m/sec, at water depth of 1250 m, and z is the water depth at which to compute the interval velocity:

$$V_{deep}(Z) = V_{1250} + (z - 1250) * 0.0166$$

In this example, the data processing system 205 can determine the average velocity of the deep layer as the average of $V_{deep}(z)$ and $V_{1250}$. This value can be referred to as the deep layer water column transit velocity.

Using the deep layer water column transit velocity and the best updated water column transit velocity, the data processing system 205 or component thereof such as the water column transit velocity generation module 210 can determine the shallow layer water column transit velocity. For example, for a given source pass of the seismic source 120 over at least some of the seismic data acquisition units 140, the data processing system 205 can determine the average shallow layer velocity and the average time of the sail line.

The average time of the sail line can be the average of the time of the sources 120, each time of shot (e.g., actuation of seismic source(s) 120) can be given a numerical time value (e.g., seconds from the beginning of a year, or floating point day of year units that could be used). The data processing system 205 can determine the average shallow layer velocity by first computing the shallow layer velocity for each seismic data acquisition unit 140/sail line pair, and then averaging the velocity for all receivers that recorded the sail line. For example, the shallow layer velocity can be determined by using the following equation:

$$V_{shallow}(t) = \frac{V_T(z, t) * z - (z - 1250) * (V_{deep}(z) + V_{deep}(1250))/2}{1250}$$

$$V_{avg}(t) = \frac{\Sigma V_{shallow}(t)}{m}$$

In the above equation, $V_T(z,t)$ is the total layer velocity determined by the processing system in step 5 above; z is the depth of the receiver determined in the previous section; $V_{deep}(z)$ is the depth dependent interval velocity defined by the equation above; 1250 is the chosen thickness of the time variant water column transit velocity layer (other values can be used); t is the average time of the sail line; $V_{avg}(t)$ is the average shallow layer velocity at time t; and m is the number of seismic data acquisition units 140 (e.g., receivers) that recorded the sail line (e.g., seismic data during a source pass or vessel 105 pass), within the offset range selected for analysis.

The above equation is an example to compute the shallow layer velocity from a known total layer velocity and a known deep layer, and the data processing system 205 can use other methods to determine the shallow layer velocity. Further, this process need not be applied only to deep (e.g., greater than 1250 m depth) seismic data acquisition units 140, as the main assumption is that the deep layer velocity either does not change as a function of time or varies slowly. For example, the second possibility is a reasonable assumption in most water exceeding about 400 m of depth. In areas where the water depth to the receivers is less than 1250 m the equations to compute the deep layer can change, or be replaced with water velocity measurements made by instruments placed on the ROVs or other devices.

The data processing system 205 can create at least one data structure (e.g., an ASCII file) indicating each average sail line time and shallow layer water column transit velocity. Data structures generated by the data processing system 205 (or obtained from the database 220) can be provided for display as a report by the data processing system 205 or be the computing device 225.

In some implementations, the data processing system 205 can identify or determine a first layer (e.g., deep) water column transit velocity for the acoustic signal and each of the plurality of seismic data acquisition units 140. The data processing system 205 can also identify or determine a second layer water (e.g., shallow) column transit velocity for the acoustic signal and each of the seismic data acquisition units 140 based on the first layer water column transit velocity and based on the updated water column transit velocity.

The data processing system 205 can also determine an average second layer (e.g., deep) water column transit velocity for at least one acoustic signal, for example by averaging the second layer water column transit velocities of an acoustic signal for a plurality of seismic data acquisition units 140. The data processing system 205 can also identify a time invariant second layer water column velocity for the second (e.g., deep) layer of the water column. The data processing system 205 can create a data structure (that can be displayed as a report) that indicates or includes the average second layer water column transit velocity for at least one acoustic signal.

Figure 3:
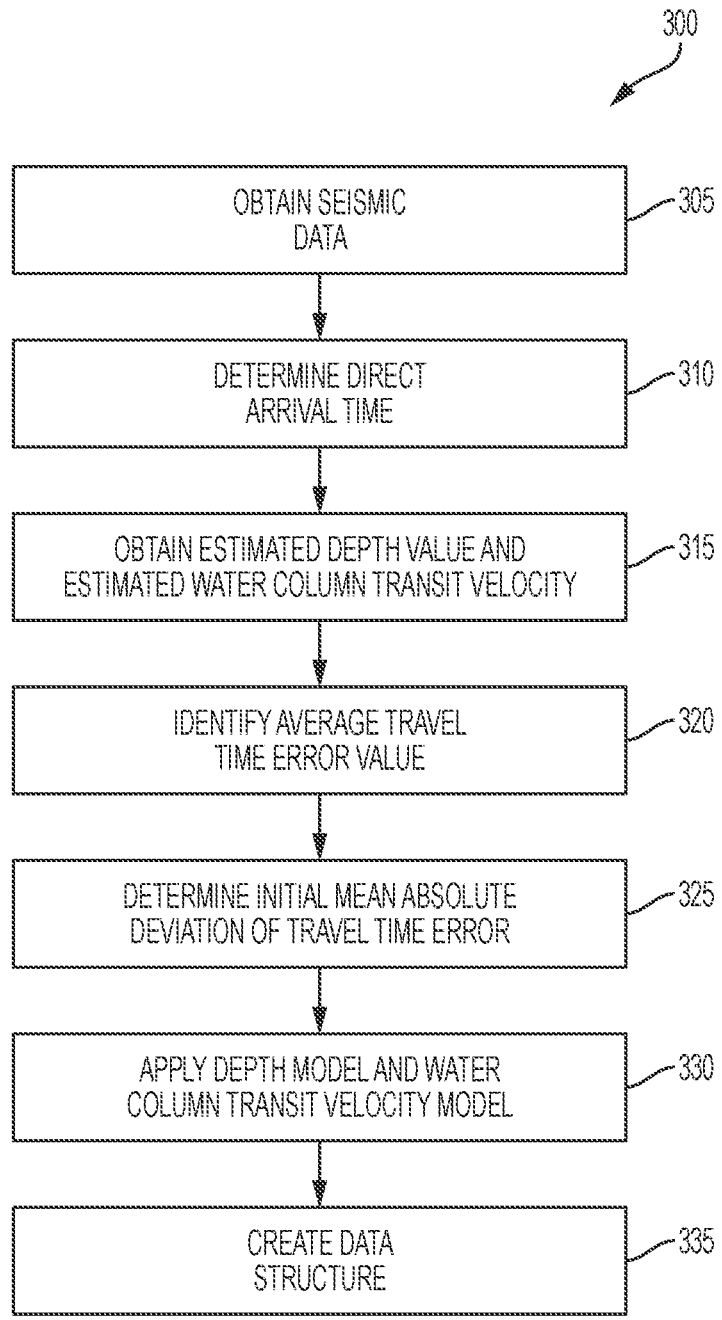
FIG. 3 is a flow diagram depicting a method of detecting seismic data acquisition unit depth and acoustic signal water column transit velocity, according to an illustrative implementation.

FIG. 3 illustrates a method 300 of detecting seismic data acquisition unit depth and acoustic signal water column transit velocity, according to an illustrative implementation. The method 300 can include an act of obtaining seismic data (ACT 305). For example, the data processing system 205 can obtain seismic data that was acquired by the seismic data acquisition units 140 responsive to at least one acoustic signal generated by the seismic source 120. The method 300 can include an act of determining the direct arrival time (ACT 310) that indicates a time period from generation of the acoustic signal to detection of the seismic data by a seismic data acquisition unit 140. The method 300 can include an act of obtaining, e.g., by the data processing system 205, at least one estimated depth value of at least one seismic data acquisition unit 140, and at least one estimated water column transit velocity of at least acoustic signal through the water column 130 (ACT 315). The method 300 can include an acts of identifying, by the data processing system 205, the average travel time error value (ACT 320), and determining the initial mean absolute deviation of the travel time error (ACT 325). The method 300 can include the data processing system 205 applying at least one of a depth model and a water column transit velocity model to the estimated depth value or to the estimated water column transit velocity to determine at least one updated depth value or at least one updated water column transit velocity (ACT 330). The method 300 can include creating, by the data processing system 205, at least one data structure indicating the updated depth value for at least one (or for each) of the seismic data acquisition units 140, or indicating the updated water column transit velocity of the acoustic signal (ACT 335).

Thus, the operations described herein can derive data acquisition unit 140 depth and water column transit velocity of acoustic signals as a function of time and depth, from the seismic data. Timing related to the receipt of the seismic data or acoustic signal by the seismic data acquisition units may not be absolutely known, so the systems and methods described herein can account for or ignore timing errors when determining the depth values and water column transit velocities. The data processing system 205 can employ a constant velocity positioning sequence to determine the position of the seismic data acquisition units 140 on the seabed 135.

Figure 4:
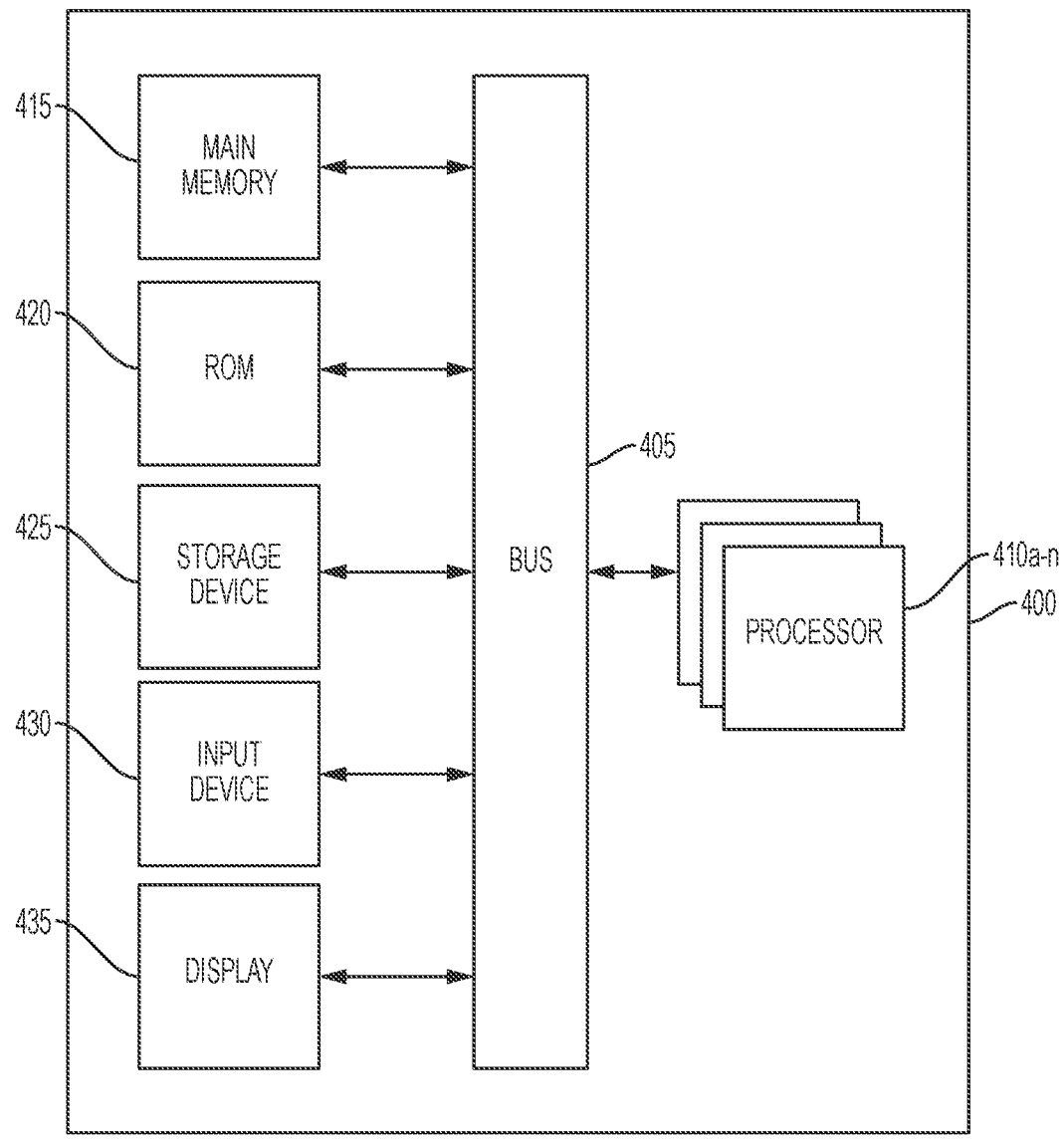
FIG. 4 is a block diagram illustrating an architecture for a computer system that can be employed to implement the systems and methods described and illustrated herein.

FIG. 4 is a block diagram of a computer system 400 in accordance with an implementation of the systems and methods described herein. The computer system or computing device 400 can include or be used to implement the system 100, data processing system 205, water column transit velocity generation module 210, depth value generation module 215, or database 220.

The computing system 400 can include at least one bus 405 or other communication component for communicating information and at least one processor 410(a-n) or processing circuit coupled to the bus 405 for processing information. The computing system 400 can also include one or more processors 410 or processing circuits coupled to the bus 405 for processing information such as the seismic data, depth values, or water column transit velocity values. The computing system 400 can include main memory 415, such as a random access memory (RAM) or other dynamic storage device, coupled to the bus 405 for storing information, and instructions to be executed by the processor 410. The Main memory 415 can include or be part of the database 220 and can be used for storing seismic data, depth model data, water column transit velocity model data, depth and updated depth values, water column transmit velocity and update water column transit velocity values, images, reports, executable code, temporary variables, or other intermediate information during execution of instructions by the processor 410. The computing system 400 may further include a read only memory (ROM) 420 or other static storage device coupled to the bus 405 for storing static information and instructions for the processor 1210. A storage device 425, such as a solid state device, magnetic disk or optical disk, is coupled to the bus 405 for persistently storing information and instructions. The storage device 425 can include or be part of the database 220.

The computing system 400 can be coupled via the bus 405 to a display 435 (e.g., of the data processing system 205), such as a liquid crystal display or an active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In some embodiments, hard-wired circuitry may be used in place of or in combination with software instructions to effect illustrative implementations. Thus, embodiments are not limited to any specific combination of hardware circuitry and software.

The systems and methods described herein can be implemented in digital electronic circuitry, or in computer software, firmware, or hardware, including the structures disclosed herein and their structural equivalents, or in combinations of one or more of them. The subject matter described herein can be implemented as one or more computer programs, e.g., one or more circuits of computer program instructions, encoded on one or more computer storage media for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described herein can be performed by a data processing apparatus on data stored on one or more computer-readable storage devices or received from other sources. The term "data processing system" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored (e.g., in the database 220) in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

While various implementations have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. Parameters, dimensions, materials, and configurations described herein are meant to be exemplary and that the actual parameters, dimensions, materials, or configurations may depend upon the specific application or applications.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The implementations described herein can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" refer to any type of computer code or set of computer-executable instructions that can be employed to program a computer or other processor to implement various aspects of embodiments as discussed herein. Additionally, one or more computer programs that when executed perform operations described herein need not reside on a single computer or processor, but may be distributed in a modular fashion amongst a number of different computers or processors.

Data structures may be stored in computer-readable media in any suitable form. Data structures may be shown to have fields that are related through location in the data structure. Such relationships may likewise be achieved by assigning storage for the fields with locations in a computer-readable medium that convey relationship between the fields. However, pointers, tags or other mechanisms can be used to establish a relationship between information in fields of a data structure, or between data elements.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the water column transit velocity generation module 210 or the depth value generation module 215 can be a single module, a logic device having one or more processing circuits, or part of one or more servers of the data processing system 205.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to "at least one" of a list of elements indicates an inclusive OR combination of the listed elements.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. For example, the marine seismic surveys can include ocean, sea, lake, transit-zone, salt water, fresh water, or mixed water surveys. Scope of the systems and methods described herein is thus indicated by the appended claims, rather than the foregoing description, and changes that come within the meaning and range of equivalency of the claims are embraced therein.

What is claimed is:

1. A method of detecting seismic data acquisition unit depth and acoustic signal water column transit velocity for a seismic survey, comprising:

obtaining, by a data processing system, seismic data acquired by a plurality of seismic data acquisition units disposed on a seabed responsive to an acoustic signal propagated from an acoustic source through a water column;

determining, by the data processing system, from the seismic data, a direct arrival time for the acoustic signal at each of the plurality of seismic data acquisition units;

obtaining an estimated depth value of each of the plurality of seismic data acquisition units and an estimated water column transit velocity of the acoustic signal;

identifying an average travel time error value based on the direct arrival time for the acoustic signal at each of the plurality of seismic data acquisition units, the estimated depth value, and the estimated water column transit velocity;

determining an initial mean absolute deviation of travel time error from the average travel time error value;

applying a depth model and a water column transit velocity model to the estimated depth value and to the estimated water column transit velocity to determine, using the initial mean absolute deviation of travel time error, an updated depth value and an updated water column transit velocity for each of the plurality of seismic data acquisition units; and creating, by the data processing system, a data structure indicating the updated depth value for each of the plurality of seismic data acquisition units.

2. The method of claim 1, comprising:
providing a rendering of the data structure for display at a computing device.

3. The method of claim 1, comprising:
identifying a first layer water column transit velocity for the acoustic signal and each of the plurality of seismic data acquisition units;
determining a second layer water column transit velocity for the acoustic signal and each of the plurality of seismic data acquisition units based on the first layer water column transit velocity and the updated water column transit velocity.

4. The method of claim 3, wherein the water column includes a first layer and a second layer, comprising:
determining an average second layer water column transit velocity for the acoustic signal based on the second layer water column transit velocity for the acoustic signal and each of the plurality of seismic data acquisition units; and
identifying a time variant second layer water column transit velocity for the second layer of the water column, wherein the second layer of the water column is shallower than the first layer of the water column.

5. The method of claim 4, comprising:
creating the data structure including the average second layer water column transit velocity for the acoustic signal.

6. The method of claim 1, wherein applying the depth model and the water column transit velocity model to the estimated depth value and to the estimated water column transit velocity comprises:
determining an updated travel time error between an estimated arrival time and the direct arrival time for each of the plurality of seismic data acquisition units;
determining an updated average travel time error;
determining an updated mean absolute deviation using the updated travel time error.

7. The method of claim 1, wherein the updated depth value is a first updated depth value, and the updated water column transit velocity is a first water column transit velocity, comprising:
identifying an updated mean absolute deviation;
determining that the updated mean absolute deviation is less than the initial mean absolute deviation;
replacing the first updated depth value with a second updated depth value; and replacing the first water column transit velocity with a second water column transit velocity.

8. The method of claim 1, wherein the updated depth value is a first updated depth value, and the updated water column transit velocity is a first water column transit velocity, comprising:
identifying a second updated depth value and a second water column transit velocity;
determining an updated mean absolute deviation;
determining that the updated mean absolute deviation is greater than the initial mean absolute deviation;
discarding the second updated depth value; and
discarding the second water column transit velocity.

9. The method of claim 1, comprising:
adjusting the estimated depth value to identify an updated estimated depth value; and
applying the depth model to the updated estimated depth value to determine the updated depth value.

10. The method of claim 1, comprising:
adjusting the estimated water column transit velocity to identify an updated estimated depth value; and
applying the water column transit velocity model to the updated estimated depth value to determine the updated depth value.

11. The method of claim 1, comprising:
deploying the seismic data acquisition units from a vessel to a seabed.

12. The method of claim 1, comprising:
obtaining, by the seismic data acquisition units, the seismic data.

13. The method of claim 1, comprising:
obtaining, by the data processing system, the seismic data responsive to a plurality of acoustic signals propagated from a plurality of seismic sources.

14. The method of claim 1, comprising:
actuating a seismic source to generate the acoustic signal.

15. A system of detecting parameters related to a marine seismic survey, comprising:
a data processing system having a depth value generation module and a water column transit velocity generation module, the data processing system configured to:
obtain seismic data acquired by a plurality of seismic data acquisition units disposed on a seabed responsive to an acoustic signal propagated from an acoustic source through a water column;
determine, from the seismic data, a direct arrival time for the acoustic signal at each of the plurality of seismic data acquisition units;
obtain an estimated depth value of each of the plurality of seismic data acquisition units and an estimated water column transit velocity of the acoustic signal;
identify an average travel time error value based on the direct arrival time for the acoustic signal at each of the plurality of seismic data acquisition units, the estimated depth value, and the estimated water column transit velocity;
determine an initial mean absolute deviation of travel time error from the average travel time error value;
apply a depth and water column transit velocity model to the estimated depth value and to the estimated water column transit velocity determine an updated depth value and an updated water column transit velocity for each of the plurality of seismic data acquisition units; and
create a data structure indicating the updated depth value for each of the plurality of seismic data acquisition units.

16. The system of claim 15, wherein the plurality of seismic data acquisition units acquire the seismic data.

17. The system of claim 15, comprising:
a seismic source that generates the acoustic signal.

18. The system of claim 15, comprising the data processing system configured to:
determine an updated travel time error between an estimated arrival time and the direct arrival time for each of the plurality of seismic data acquisition units;
determine an updated average travel time error; and
determine an updated mean absolute deviation using the updated travel time error.

19. The system of claim 15, wherein the updated depth value is a first updated depth value, and the updated water column transit velocity is a first water column transit velocity, comprising the data processing system configured to:
identify an updated mean absolute deviation;
determine that the updated mean absolute deviation is less than the initial mean absolute deviation;
replace the first updated depth value with a second updated depth value; and
replace the first water column transit velocity with a second water column transit velocity.

20. A computer readable storage medium storing instructions that when executed by one or more data processors, cause the one or more data processors to perform operations comprising:
obtaining seismic data acquired by a plurality of seismic data acquisition units disposed on a seabed responsive to an acoustic signal propagated from an acoustic source through a water column as part of a seismic survey;
determining, from the seismic data, a direct arrival time for the acoustic signal at each of the plurality of seismic data acquisition units;
obtaining an estimated depth value of each of the plurality of seismic data acquisition units and an estimated water column transit velocity of the acoustic signal;
identifying an average travel time error value based on the direct arrival time for the acoustic signal at each of the plurality of seismic data acquisition units, the estimated depth value, and the estimated water column transit velocity;
determining an initial mean absolute deviation of travel time error from the average travel time error value;
determining an updated depth value and an updated water column transit velocity for each of the plurality of seismic data acquisition units; and
creating a data structure indicating the updated depth value for each of the plurality of seismic data acquisition units.

* * * * *